(12) United States Patent (10) Patent No.: US 8,458,686 B2
Karstens (45) Date of Patent: Jun. 4, 2013

(54) GUARANTEEING AUTHENTIC FIRMWARE FOR PURPOSES OF CLONING

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 11/550,526

(22) Filed: Oct. 18, 2006

(65) Prior Publication Data

US 2008/0098390 A1 Apr. 24, 2008

(51) Int. Cl.
*G06F 9/45* (2006.01)

(52) U.S. Cl.
USPC ........... 717/168; 717/169; 717/171; 717/173; 717/174; 717/175

(58) Field of Classification Search
USPC .................. 717/168, 169, 171, 173–176, 178
See application file for complete search history.

(56) References Cited

U.S. PATENT DOCUMENTS

| 4,849,927 | A | | 7/1989 | Vos |
| 5,623,604 | A | * | 4/1997 | Russell et al. ................. 717/167 |
| 6,138,236 | A | | 10/2000 | Mirov et al. |
| 6,275,933 | B1 | | 8/2001 | Fine et al. |
| 6,618,930 | B1 | | 9/2003 | Fish et al. |
| 6,678,741 | B1 | * | 1/2004 | Northcutt et al. ............. 709/248 |
| 6,708,231 | B1 | | 3/2004 | Kitagawa |
| 6,978,453 | B2 | | 12/2005 | Rao et al. |
| 7,707,570 | B2 | * | 4/2010 | Yoshimura et al. ........... 717/170 |
| 2006/0149727 | A1 | * | 7/2006 | Viitaharju .......................... 707/5 |
| 2007/0234130 | A1 | * | 10/2007 | Sullivan et al. ................. 714/43 |

FOREIGN PATENT DOCUMENTS

EP 0601704 A1 6/1994

OTHER PUBLICATIONS

JP2005141624 A. Publication Date: Feb. 6, 2005 "Verification Apparatus, Verification Method, and Program". (Abstract Only), Masami, et al., p. 1.

* cited by examiner

*Primary Examiner* — Qamrun Nahar
(74) *Attorney, Agent, or Firm* — Cantor Colburn LLP; Steven Bennett

(57) ABSTRACT

A computer program product for cloning an authentic master firmware to create a child firmware, the instructions for implementing a method include receiving cloning instructions; locating a secure source including the authentic master firmware; and cloning the authentic master firmware to create the child firmware.

16 Claims, 4 Drawing Sheets

GUARANTEEING AUTHENTIC FIRMWARE FOR PURPOSES OF CLONING

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to installing authentic firmware.

2. Description of the Related Art

In some applications it is necessary to program firmware. Firmware is a computer program stored in read-only memory (ROM) or erasable programmable read-only memory (EPROM). For example, the firmware may be a BIOS (Basic Input/Output System). The process of duplicating firmware levels and firmware settings from one machine to another machine is known as "cloning."

The ability to distinguish between authentic firmware, which one wants to clone, and imposters is limited. Imposter firmware may include, for example, firmware not ready for release, firmware with viruses, and corrupt firmware. Cloning operators may not have expert knowledge in the various firmware products from various companies. If the firmware in a master machine is corrupt, cloning operators may unknowingly distribute the corrupt firmware throughout their operations.

What are needed are hardware and software that will insure that firmware used for cloning purposes is authentic.

SUMMARY OF THE INVENTION

The shortcomings of the prior art are overcome and additional advantages are provided through the provision of a computer program product stored on machine readable media including machine readable instructions for cloning an authentic master firmware to create a child firmware, the instructions for implementing a method include receiving cloning instructions, locating a secure source including the authentic master firmware, and cloning the authentic master firmware to create the child firmware.

Also disclosed is a computer program product stored on machine readable media including machine readable instructions for cloning an authentic master firmware to create a child firmware, the instructions for implementing a method include receiving cloning instructions; determining that an option to clone the authentic master firmware from a secure source is selected; locating the secure source comprising the authentic master firmware; and cloning the authentic master firmware to create the child firmware.

Also disclosed is a computer server including a computer program product having instructions for cloning an authentic master firmware to a child firmware, the product includes instructions for receiving cloning instructions; determining that an option to clone the master firmware from a secure source is selected; establishing a list of secure sources to be used for cloning; hardcoding the list of secure sources in the cloning server; locating the secure source; reviewing the list of secure sources; validating the authentic master firmware at the secure source; establishing conditions for intermediate firmware to remain in memory; establishing a period of time that the intermediate firmware is allowed to remain in memory; and cloning the master firmware to create the child firmware.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which includes a computer program product stored on machine readable media including machine readable instructions, for cloning an authentic master firmware to create a child firmware, the instructions for implementing a method include receiving cloning instructions, locating a secure source including the authentic master firmware, and cloning the authentic master firmware to create the child firmware.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The teachings herein provide for insuring that master firmware used for cloning is authentic. The cloning process relates to copying firmware from the master firmware to at least one child firmware. The master firmware is referred to as a "master" and the child firmware is referred to as a "child." The resulting child is a copy of the master. If assurance exists that the master is uncorrupted and ready for release, then the master is referred to as "authentic." "Authentic master firmware," therefore, is uncorrupted and ready for cloning. Assurance is provided by storing the authentic master firmware in a secure source. The "secure source" is protected from intrusion by those with unauthorized access. Other sources for storing master firmware include those sources that are not secure.

Figure 1:
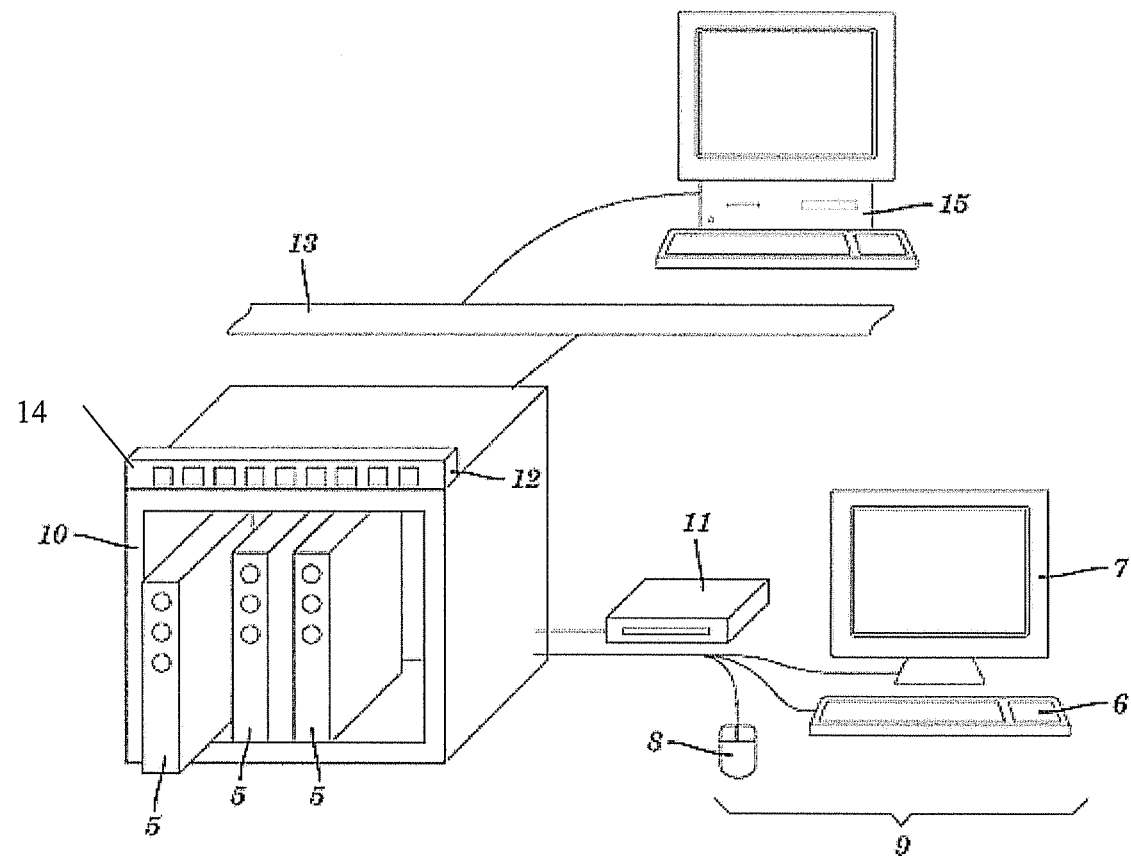
FIG. 1 depicts a central server.

Referring to FIG. 1, there is shown an embodiment of a central server referred to as a blade chassis 10. In one embodiment, a plurality of blade servers 5 (or blade server 5) fit in the blade chassis 10 like books in a bookshelf. Typically, each of the blade servers 5 is an independent server 10, with its own processors, memory, storage, network controllers, operating system and applications (not shown). Each blade server 5 slides into a bay in the blade chassis 10 and plugs into a mid-plane or backplane of the blade chassis 10. The plurality of blade servers 5 are thus provided with shared power, fans, floppy drives, switches, ports and other supporting resources.

In typical embodiments, each blade server 5 is of a compact design, and "hot-swappable" (meaning designed for automatic installation and operation when inserted into the blade chassis 10 at power, and likewise removable at power).

Many critical components of the blade chassis 10 can be made redundant or hot-swappable, including cooling systems, power supplies, Ethernet controllers and switches, midplanes and backplanes, hard disk drives and service processors. In short, the blade chassis 10 and the blade servers 5 therein provide resources for storing and executing software (machine readable instructions).

The benefits of using the blade chassis 10 are known to anyone tasked with running down hundreds of cables strung through racks just to add and remove resources. With switches and power units shared, precious space is freed up. This means that blade servers 5 enable higher density of computing resources with far greater ease.

In blade technology, new servers are deployed by sliding blade servers 5 in and out of the blade chassis 10. Each blade server 5 connects to infrastructure components coupled to the chassis 3. Therefore, most designs for blade servers 5 do not require plugging of multiple cables for installation. Exemplary infrastructure components include a keyboard 6, a video display 7, a mouse 8, and a network 13. Collectively, the keyboard 6, video display 7 and mouse 8 are referred to as a KVM 9. Other components include a compact disc drive, an optical drive, a floppy drive, a flash drive, and other types of drives, which are collectively referred to as the "optical media 11."

In advanced blade server systems, machine readable and executable instructions deployed as software provide additional aspects of functionality. For example, in one embodiment, when one slides the blade server 5 into a bay of the blade chassis 10, the software automatically loads a designated operating system and application image into the blade server 5. This provides for getting the newly installed blade server 5 up and running with no human intervention. The software typically provides for repurposing of each blade server 5 as necessary, replacing a failing blade server 5 or applying spare blade servers 5 to help handle peak loads and may perform other functions as desired by system designers, managers or users.

In one embodiment, with reference to FIG. 1, aspects of the blade chassis 10 are monitored and managed from a single location. For example, the blade chassis 10 can be managed from a console 15 used to manage other components in a computing infrastructure. In some embodiments, the blade chassis 10 is managed through an easy-to-use graphical interface that allows remote connection from any terminal connected to the respective network 13. In typical embodiments, a management module 12 is included with the blade chassis 10. The management module 12 is like a computer processing system. The management module 12 typically includes software, firmware, and hardware (such as processors, storage and memory) for, among other things, communication with the various blade servers 5 and a network 13 connecting the blade chassis 10 and other resources. The management module 12 typically includes memory 14. Also typically, the console 15 includes an interface with the management module 12.

The teachings herein provide for communication of firmware and firmware data between the blade servers 5 and the management module 12. The data may include, without limitation, information and settings regarding aspects of the firmware for each blade server 5. The aspects may include, for example, a version of the firmware. The techniques provide for downloading firmware from a source to the memory 14.

The techniques also provide for downloading firmware from the memory 14 to at least one selected blade server 5. Alternatively, the techniques provide for downloading firmware directly from a source to at least one selected blade server 5. As used herein, "downloading" is part of the cloning process. Downloading includes the process of transferring a copy of firmware from one memory location to another memory location.

Typically, each blade server 5 has firmware. In one embodiment, the blade chassis 10 can perform multiple actions with respect to the firmware. For example, the blade chassis 10 can identify the firmware in each blade server 5. The blade chassis 10, typically, can download firmware to each blade server 5. In another example, the blade chassis 10 may clone firmware from one blade server 5 to at least one other blade server 5. The blade chassis 10 may access the master firmware at several locations. For example, the master firmware may be accessed via at least one of the network 13 and the optical media 11.

Figure 2:
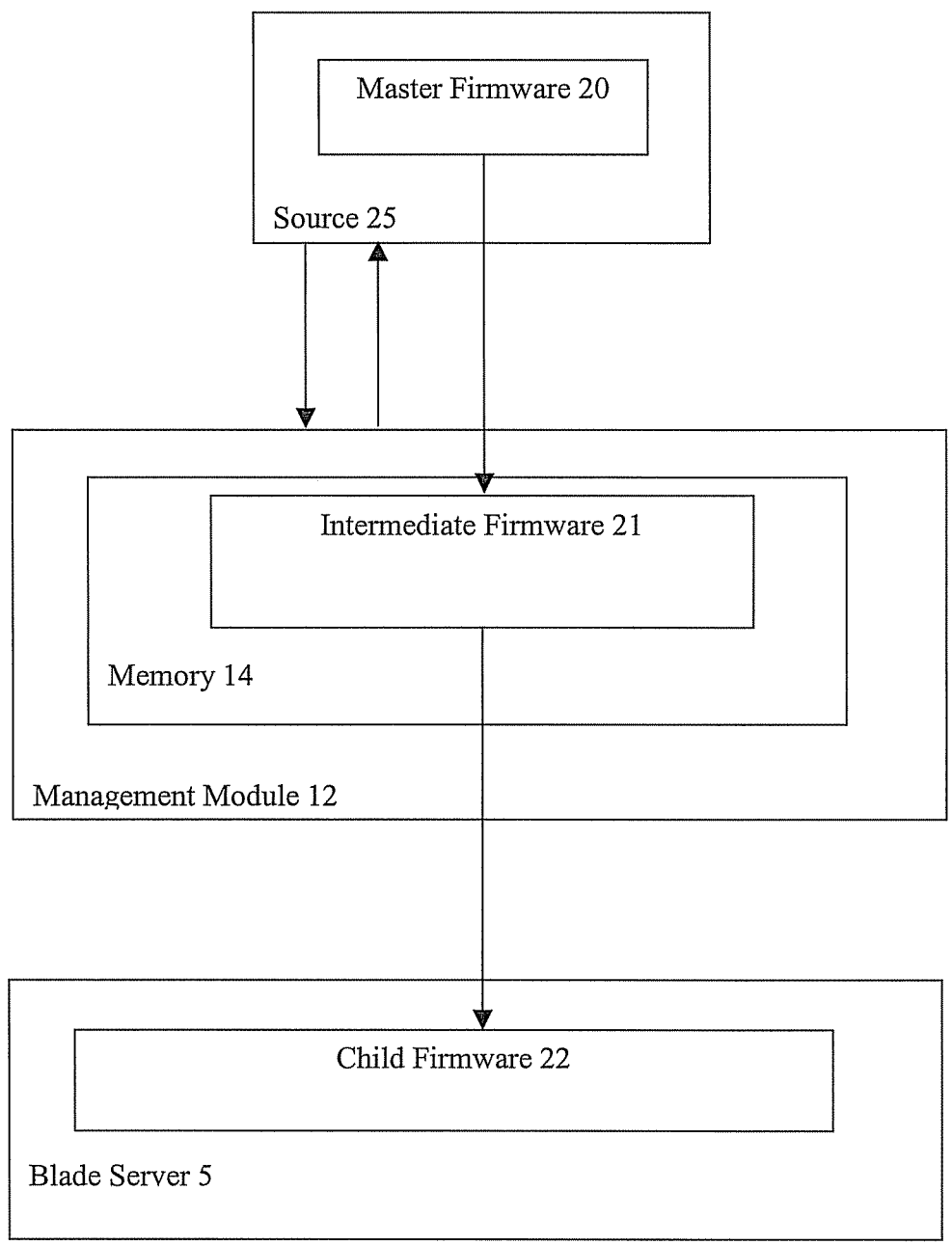
FIG. 2 depicts aspects of cloning master firmware.

FIG. 2 depicts aspects of cloning master firmware 20. Typically, the management module 12 controls the cloning process. The management module 12 locates a source 25 for the master firmware 20. The source 25 is a location where the master 20 is stored. For example, the source 25 may be the optical media 11. A connection is established from the management module 12 to the source 25. In one embodiment, the management module 12 downloads a copy of the master 20 to the memory 14. The copy is referred to as "intermediate firmware 21." Typically, the intermediate firmware 21 is controlled by the management module 12. The management module 12 can use the intermediate firmware 21 to clone child firmware 22. In another embodiment, the child 22 may be directly cloned from the source 25.

Typically, the child firmware 22 is created by the management module 12 downloading a copy of the intermediate firmware 21 to the blade server 5. For simplicity, the teachings herein describe cloning the master 20 to create the child 22 in the blade server 5. In one embodiment, the management module 12 can clone the master 20 to create a plurality of children 22 for the plurality of blade servers 5.

Figure 3:
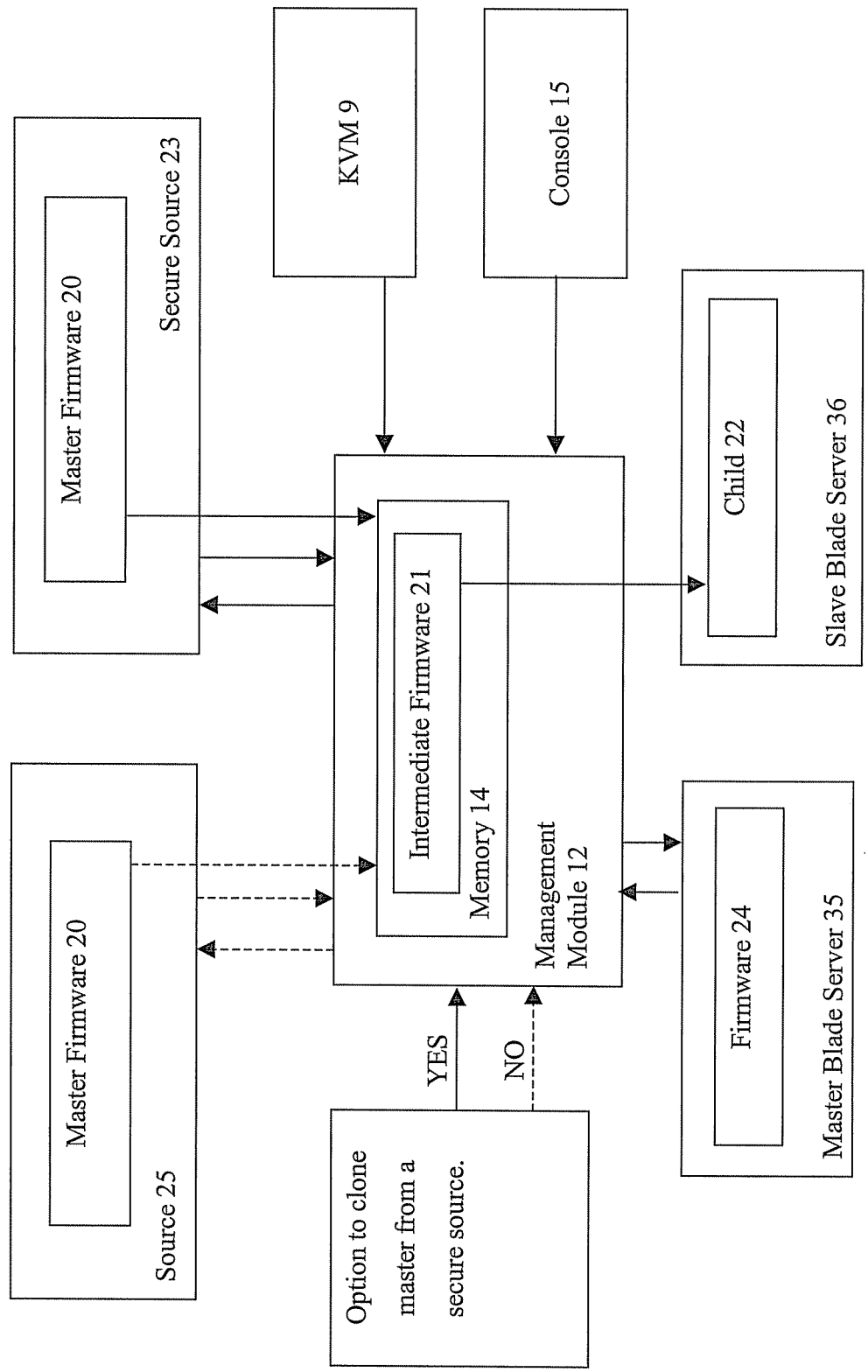
FIG. 3 depicts aspects of using authentic master firmware when cloning firmware between two blade servers.

The teachings call for assuring that the master 20 used for cloning is authentic. FIG. 3 depicts aspects of using authentic master firmware when cloning firmware between two blade servers 5 (referred to as master blade server 35 and slave blade server 36). Referring to FIG. 3, in typical embodiments, assurance is provided by retrieving the master 20 from a secure source 23. The secure source 23 can be a plurality of secure sources 23. In one embodiment, the secure source 23 is identified by an internet address. The internet address is accessed via the network 13. The secure source 23 location can be secured by ways known in the art. For example, the secure source 23 can be protected by encryption. Also, the secure source 23 can have firmware that is difficult to modify.

The management module 12 can determine which secure source 23 to use in a number of ways. In one embodiment, a blade operator establishes a list of secure sources 23 in the blade chassis 10. The blade operator is able to add to and edit the list. In another embodiment, the list of secure sources 23 is embedded (i.e., hardcoded) into the blade chassis 10. "Hardcoding" refers to the software development practice of embedding data into the source code of a program. Once data is hardcoded it may not be possible for an operator to modify.

The management module 12 will establish a connection between itself and the secure source 23. Typically, when accessing the secure source 23, the management module 12 will validate the master 20. Alternatively, the master 20 may be validated after it is downloaded to at least one of the management module 12 and the blade server 5. In one embodiment, the validation includes verifying at least one of a digital certificate and a digital signature.

In one embodiment, the intermediate firmware 21 may persist in the memory 14. The intermediate firmware 21 could then be used to clone again without downloading from the secure source 23. Typically, the management module 12 can be programmed with a set of conditions for the intermediate firmware 21 to remain in the memory 14. For example, the management module 12 can be programmed to erase the intermediate firmware 21 from the memory 14 at a predetermined time. Also, the module 12 can be programmed to erase the intermediate firmware 21 if the module 12 is powered off.

Referring to FIG. 3, in one embodiment, two blade servers 5 can work together in a configuration known as master and slave. Typically, a user can direct the management module 12 to clone a firmware 24 from a master blade server 35 to a slave blade server 36. Typically, the user can direct the management module 12 via one of the KVM 9 and the console 15. The management module 12 receives settings from the master blade server 35 identifying the firmware 24. For the teachings herein, the master 20 is an authentic master of the firmware 24. The management module 12 determines if an option to clone the master 20 from the secure source 23 is selected. If the option is not selected, the master 20 may be cloned from other sources 25.

In one typical embodiment, if the option to force cloning from the secure source 23 is selected, the management module 12 will review the list of secure sources 23 to locate the secure source 23 for the firmware 24. A connection will be established between the management module 12 and the secure source 23. Typically, the master 20 will be validated. The management module 12 will download a copy of the master 20 to the memory 14 creating the intermediate firmware 21. The intermediate firmware 21 will be downloaded to the slave blade server 36, creating the child 22. In another embodiment, the master 20 will be downloaded directly to the slave blade server 36, creating the child 22. Also, in another embodiment, the master 20 may be validated after it is downloaded to at least one of the master module 12 and the slave blade server 36.

Figure 4:
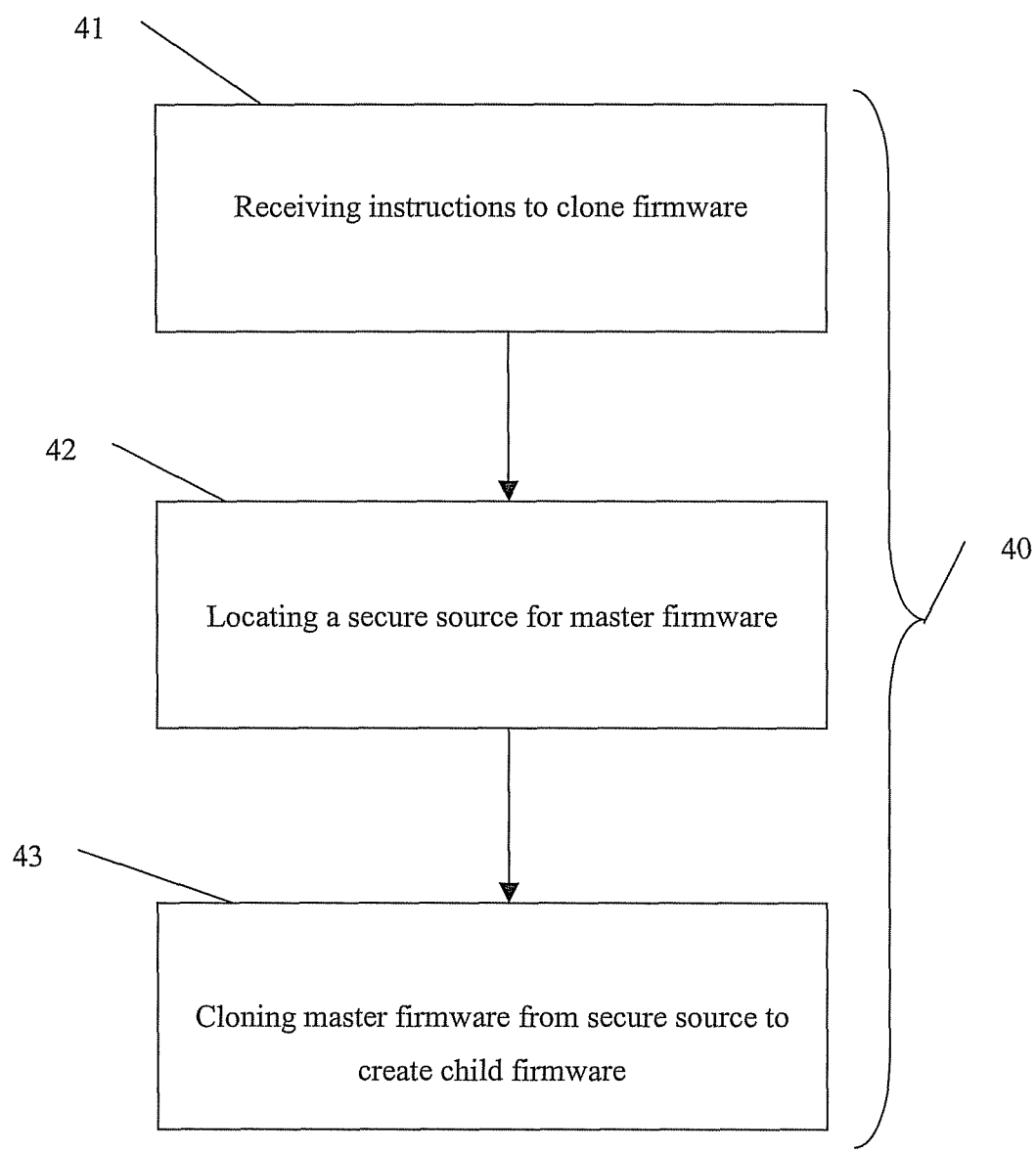
FIG. 4 is a flow chart depicting aspects of a method for cloning authentic master firmware.

FIG. 4 is a flow chart depicting aspects of a method 40 for cloning authentic master firmware 20. Because the method 40 clones authentic master firmware, it is presupposed that the option to clone the master 20 from the secure source 23 has been selected. A first step 41 calls for receiving instructions to clone the firmware 24. The firmware 24 may be for the master blade server 35. The instructions may call for cloning the firmware 24 for the slave blade server 36. The first step 41 may include identifying the firmware 24 of the master blade server 35. The first step 41 may also include determining that the option to clone the master 20 from the secure source 23 is selected. A second step 42 calls for locating the secure source 23. The second step 42 may include reviewing a list of secure sources 23. The second step 42 may include establishing a connection between the management module 12 and the secure source 23. The second step 42 may also include validating the master 20. A third step 43 calls for cloning the master 20 from the secure source 23 to create the child 22. The third step 43 may include downloading the master 20 to the memory 14, creating the intermediate firmware 21. The third step 48 may also include downloading the intermediate firmware 21 from the memory 14 to the slave blade server 36, creating the child 22.

The teachings herein discuss the blade chassis 10 and the blade servers 5, collectively referred to as blade technology. The teachings also apply to other central servers not using blade technology.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product stored on machine readable media comprising machine readable instructions for cloning an authentic master firmware to create a child firmware in a blade server disposed in a blade chassis, the instructions for implementing a method comprising:
   receiving cloning instructions with a management module disposed in the blade chassis and configured to manage communications between blade servers disposed in the blade chassis and a network;
   locating a secure source comprising the authentic master firmware using the management module; and
   cloning the authentic master firmware using a connection established by the management module to create the child firmware in the blade server.

2. The computer program product as in claim 1, further comprising establishing a list of secure sources in the blade chassis to be used for cloning.

3. The computer program product as in claim 2, further comprising hardcoding the list of secure sources in the blade chassis.

4. The computer program product as in claim 2, wherein the management module reviews the list of secure sources to locate the secure source having the authentic master firmware.

5. The computer program product as in claim 1, further comprising validating the authentic master firmware by verifying at least one of a digital certificate and a digital signature.

6. The computer program product as in claim 1, further comprising downloading the authentic master firmware into intermediate firmware in the management module and establishing conditions for the intermediate firmware to remain in memory.

7. The computer program product as in claim 6, wherein establishing conditions comprises establishing a period of time that the intermediate firmware is allowed to remain in the memory.

8. The computer program product as in claim 1, wherein the machine readable media comprises one of an optical drive, a compact disc drive, a hard drive, a floppy drive, a flash drive, and a network.

9. The computer program product as in claim 1, wherein cloning comprises downloading the authentic master firmware from the secure source and communicating a setting of the authentic master firmware using the management module.

10. The computer program product as in claim 1, wherein cloning comprises downloading the authentic master firmware from the secure source and communicating a version of the authentic master firmware using the management module.

11. A computer program product stored on machine readable media comprising machine readable instructions for cloning an authentic master firmware to create a child firmware in a blade server disposed in a blade chassis, the instructions for implementing a method comprising:
  receiving cloning instructions with a management module disposed in the blade chassis and configured to manage communications between blade servers disposed in the blade chassis and a network;
  determining that an option to clone the authentic master firmware from a secure source is selected using the management module;
  locating the secure source comprising the authentic master firmware using the management module; and
  cloning the authentic master firmware using a connection established by the management module to create the child firmware in the blade server.

12. The computer program product as in claim 11, wherein cloning comprises downloading the authentic master firmware from the secure source and communicating a setting of the authentic master firmware using the management module.

13. The computer program product as in claim 11, wherein cloning comprises downloading the authentic master firmware from the secure source and communicating a version of the authentic master firmware using the management module.

14. A blade server system comprising a computer program product having instructions for cloning an authentic master firmware to create a child firmware in a blade server disposed in a blade chassis, the product comprising instructions for:
  receiving cloning instructions with a management module disposed in the blade chassis and configured to manage communications between blade servers disposed in the blade chassis and a network;
  determining that an option to clone the authentic master firmware from a secure source is selected using the management module;
  establishing a list of secure sources to be used for cloning in the blade chassis;
  hardcoding the list of secure sources in the server in the blade chassis;
  reviewing the list of secure sources using the management module;
  locating the secure source from the list of secure sources using the management module;
  validating the authentic master firmware using the management module;
  establishing conditions in the management module for intermediate firmware in the management module having downloaded authentic firmware to remain in memory;
  establishing a period of time that the intermediate firmware is allowed to remain in memory using the management module; and
  cloning the authentic master firmware using a connection established by the management module to create the child firmware in the blade server.

15. The computer program product as in claim 14, wherein cloning comprises downloading the authentic master firmware from the secure source and communicating a setting of the authentic master firmware using the management module.

16. The computer program product as in claim 14, wherein cloning comprises downloading the authentic master firmware from the secure source and communicating a version of the authentic master firmware using the management module.

* * * * *